United States Patent Office 3,496,169
Patented Feb. 17, 1970

3,496,169
CYANOHYDRIN SYNTHESIS
Wataru Nagata, Nishinomiya-shi, and Mitsuru Yoshioka, Toyonaka-shi, Japan, assignors to Shionogi & Co., Ltd., Higashi-ku, Osaka, Japan
No Drawing. Continuation-in-part of application Ser. No. 622,890, Mar. 14, 1967. This application Dec. 30, 1968, Ser. No. 788,057
Claims priority, application Japan, Mar. 14, 1966, 41/15,981
Int. Cl. C07c *173/00*
U.S. Cl. 260—239.55                5 Claims

ABSTRACT OF THE DISCLOSURE

A novel process for the preparation of α-cyanohydrins characterized by reacting an aldehydic or ketonic carbonyl compound with an alkylcyanoaluminum compound of the formula: RR'AlCN (R and R' are herein defined) at low reaction temperature within a short reaction period; being useful in chemical and pharmaceutical industries for production of intermediates and protection of carbonyl substituents in synthetic work. The method especially effectively available for the first time for α-cyanohydrin synthesis of conjugated carbonyl compounds heretofore hardly or not afforded.

---

This application is a continuation-in-part of U.S. Ser. No. 622,890, filed Mar. 14, 1967, now abandoned.

The present invention relates to a process for the preparation of α-cyanohydrins. More particularly, it relates to a novel cyanohydrin synthesis which comprises subjecting a carbonyl compound to a reaction with an alkylcyanoaluminum compound.

The various methods for the preparation of α-cyanohydrins by the reaction of a carbonyl compound with hydrogen cyanide or its derivative were developed in the chemical and pharmaceutical industries (e.g. U.S. Patent No. 2,101,823; U.S. Patent No. 2,259,167).

The present inventors have for the first time investigated the cyanohydrin formation by the sole action of alkylcyanoaluminum compounds and, as a result, it has now been discovered that the alkylcyanoaluminum compounds possess high reactivity as reagent for the α-cyanohydrin formation and the reaction proceeds very well even in the case of unsuccessful formation by any other methods. The present invention has been instituted on this discovery.

The alkylcyanoaluminum compounds used in the present invention are represented by the following formula:

RR'AlCN wherein R and R' each represents a lower alkyl group such as methyl, ethyl, propyl, butyl, isobutyl, or the like. Representative of them are dimethylaluminum cyanide, diethylaluminum cyanide, diisobutylaluminum cyanide or the like.

The alkylcyanoaluminum compounds may be prepared by the reaction of a corresponding alkylaluminum compound and the calculated amount of a substance substantially capable of releasing cyanide ion such as hydogen cyanide, a salt thereof, a cheap and easily available cyanohydrin such as acetone cyanohydrin or the like, by the method developed by the inventors according to the following reaction scheme:

RR'R"Al+MCN ⟶ AlRR'CN+R"M wherein R and R' each represents the same meanings as described above; R" is a lower alkyl group, a lower alkoxy group, or a hydrogen atom; and M represents an organic residue, a hydrogen atom, or a metal atom.

The reaction of a starting carbonyl compounds with the aforementioned cyanating agent may be carried out in an aprotic solvent such as a hydrocarbon (e.g. pentane, hexane, cyclohexane, benzene, toluene, or the like), a halogenated hydrocarbon (e.g. chloroform, dichloromethane, dichloroethane, or the like), an ether (e.g. diethyl ether, diisopropyl ether, tetrahydrofuran, or the like) or an optional combination thereof. The reaction temperature not higher than room temperature and the reaction period not longer than 5 hours, in many cases within 1 hour, is available. The reaction proceeds very rapidly and is therefore almost completed in a moment without heating (sufficient below 0° C. in general). Accordingly, the procedure is quite convenient since there is no side-reaction such as hydrolysis or the like. The reaction mixture may be worked up in the conventional manner to recover the product after addition of (preferably acidic) water or an alcohol to decompose an excess of alkylcyanoaluminum compound remaining unreacted. By such a simple process using an alkylcyanoaluminum compound, α-cyanohydrin of a ketone conjugated with aromatic nuclei, e.g. α-tetralone, which could heretofore not or hardly been obtained can be obtained in good yield.

As the starting carbonyl compound any saturated or unsaturated (unconjugated or conjugated, including aromatic system) carbonyl compound in acyclic, cyclic or hetero-cyclic series may be used. The starting carbonyl compound may simultaneously bear any partial structure or substituent, as far as it does not interfere proceeding of the subject reaction, such as an unsaturation, acyclic or cyclic ether linkage, ester, acetal, ketal, acyloxy, lactone, amide hydroxy, or the like. When the starting material is an α,β-unsaturated conjugated ketone, the following equilibrium system is involved:

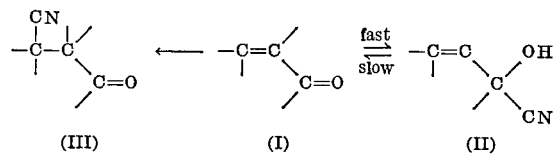

(III)         (I)         (II)

Thus, the starting material (I) is converted almost in a moment into the objective α-cyanohydrin (II) but the latter is then transformed gradually into the undesirable β-cyano keton (III) through (I). Therefore, in such a case, it is appropriate to carry out the reaction at a low temperature (for example —100 to —50° C.) and in a relatively polar solvent such as tetrahydrofuran or the like to reduce the reaction rate, and more preferably to complete the reaction at the earliest possible stage for the purpose of obtaining the α-cyanohydrin (II) in good yield. The cyanohydrins prepared according to the present process may be obtained usually as a mixture of the two isomeric forms.

The α-cyanohydrin synthesis is useful in chemical or pharmaceutical industries because it provides a means of lengthening the carbon chain of the various compounds.

Representative of application of the α-cyanohydrin synthesis is the well-known Kiliani-Fischer method for extending the chain length of sugars. For example the Kiliani-Fischer reaction has been applied by Haworth and Reichstein to the synthesis of 1-ascorbic acid (vitamin C) from 1-xylosone (T. Reichstein, Ber., 63, 749 (1930)).

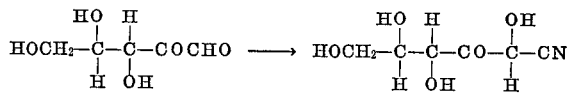

The method of the present invention is of course applicable in these reaction sequences.

In the steroid field the method of the present invention may be applied in synthesis of progesterone from androstenolone as indicated by the following reaction scheme:

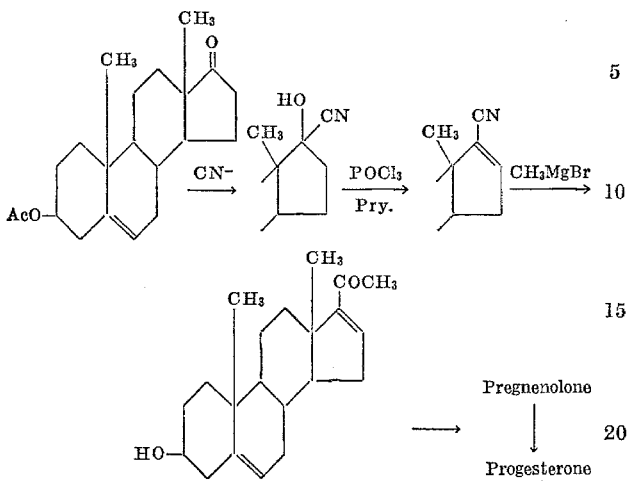

(A. Butenandt and J. Schmidt-Thomé, Ber., 71, 1487 (1938); 72, 182 (1939)).

Another example of commercial process in the steroid field is application to conversion of a 20-ketone to the 17α-hydroxy-20-ketone. The reaction is exemplified as follows:

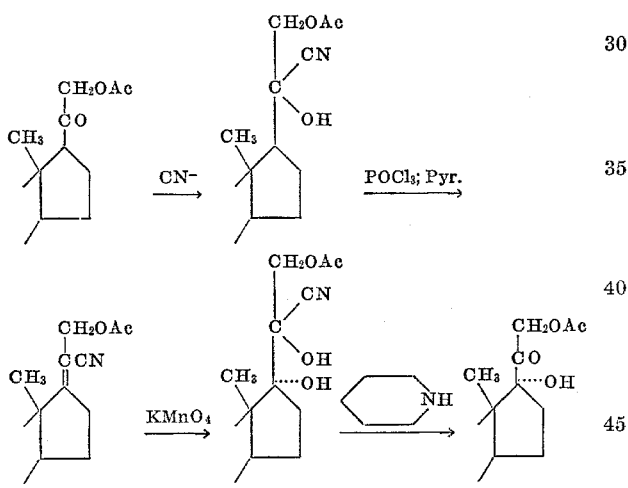

(R. Tull, R. E. Jones, S. A. Robinson, and M. Tishler, J. Am. Chem. Soc., 77, 196 (1955)).

Moreover the α-cyanohydrin synthesis has been used as a convenient route for the conversion of aromatic aldehydes to ary acetonitriles in good over-all yield.

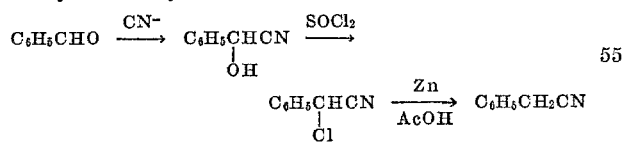

Furthermore the α-cyanohydrins may be used for the preparation of 2,5-diaryloxazole (Fischer's synthesis) and of hydantoins (Bucherer-Berg's reaction) as the following reaction schemes:

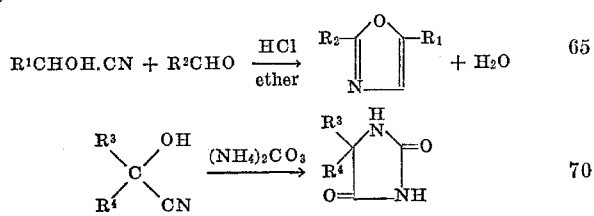

wherein $R^1$, $R^2$, $R^3$, and $R^4$ each represents a hydrogen atom or an aryl group (Chem. Rev., 37, 410 (1945); 46, 422 (1950)).

The hydantoins of the above-described general formula, e.g. diphenylhydantoin, or derivatives thereof have been used as anticonvulsants or antiepileptics.

The α-cyanohydrin synthesis may be also applied to synthesis of α-amino acids (Tiemann modification of the Strecker synthesis of α-amino acids; Chem. Rev., 42, 236 (1948)).

An additional example on utility of the α-cyanohydrin synthesis is the Tiffeneau ring enlargement (Organic Reactions, 11, p. 157 (1960)). For example, androsterone may be converted to D-homoandrosterone as following reaction scheme:

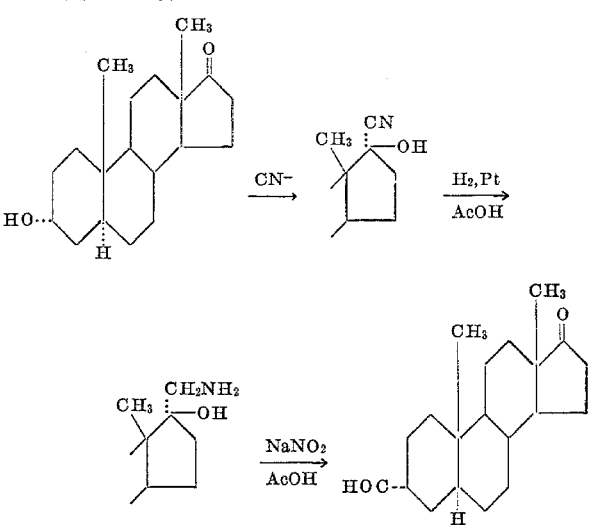

(M. W. Goldberg and R. Monnier, Helv., 23, 376, 840 (1940)). The D-homosteroids, e.g. 19-nor-D-homotestosterone, possess hormonal activity useful as medicaments, e.g. anabolic activity (Angew. Chem. Internat. Edit., 3, 356 (1964)).

EXAMPLE 1

A solution of 3β-acetoxy-5-pregnen-20-one (500 mg.) in anhydrous toluene (5 ml.) is cooled to −25° C. To the solution there is added a solution of diethylaluminum cyanide (620 mg.) in toluene and the resultant solution is kept at −25° C. for 15 minutes under nitrogen atmosphere. The reaction mixture is then poured into a mixture of methanol and concentrated hydrochloric acid (3:1) cooled to −70° C. and the resultant mixtures is, after addition of ice-water (150 ml.), extracted with dichloromethane. The extract is washed with water, dried over anhydrous sodium sulfate, and evaporated to dryness. The crystalline residue on recrystallization from dichloromethane-ether affords 20-cyano-5-pregnene-3β,20-diol 3-acetate (430 mg.) having M.P. 154.5–156.5° C.

EXAMPLE 2

To a solution of 6-methoxy-1,2,3,4-tetrahydronaphthalen-1-one (6.15 g.) in anhydrous toluene (60 ml.), there is added a solution of diethylaluminum cyanide (7.0 g.) in benzene. The mixture is kept at −15° C. for 20 minutes and thereafter worked up in a manner similar to Examle 1, thereby 1-cyano-6-methoxy-1,2,3,4-tetrahydronaphthalen-1-ol (7.2 g.) is obtained as an oily material.

The resultant oily cyanohydrin is, after addition of potassium hydrogen sulfate (200 mg.), distilled under reduced pressure and the distillate (6.2 g.) having B.P. 135–142° C./0.2 mm. Hg is collected. The distillate on recrystallization from ether-petroleum ether affords 1-cyano-6-methoxy-3,4-dihydronaphthalene (4.2 g.) having M.P. 50.5–51° C., and from the mother liquid the starting material (130 mg.) is recovered. The mother liquid is further chromatographed over neutral alumina (60 g.) to collect petroleum ether fraction which on recrystallization from methanol affords the above cyanodihydro product (1.3 g.; total 5.5 g.). Benzene fraction of the same chromatography on recrystallization from ether-petroleum ether affords the additional starting material (0.6 g.; total 0.73 g.).

EXAMPLE 3

To a solution of 3β-hydroxy-21-nor-5,16-pregnadien-20-ol (150 mg.) in anhydrous toluene (7.5 ml.), there is added a solution of diethylaluminum cyanide (201 mg.) in toluene (2 ml.) at 0° C. and the solution is allowed to stand at the same temperature for 5 minutes. The reaction mixture is poured into ice-cooled 2 N-hydrochloric acid, and extracted with dichloromethane. The extract is worked up in the usual manner and the resultant crude product is recrystallized from dichloromethane to give 3β,20-dihydroxy-5,16-pregnadiene-21 - nitrile (138 mg.) having M.P. 170–171.5° C.

Reaction of 5α-androstan-17-one and diethylaluminum cyanide in the same manner affords 17-cyano-5α-androstan-17-ol having M.P. 137.5–143° C. (decomposition) in 81% yield.

Reaction of 3β-acetoxy-5-androsten-17-one and diethylaluminum cyanide in the nearly same manner affords 17-cyano-5-androstene-3β,17-diol 3-acetate having M.P. 160–162° C. (recrystallized from dichloromethane-ether) in 85% yield.

Reaction of 17β-acetoxy-5α - androstan-3-one and diethylaluminum cyanide in the nearly same manner affords 3-cyano-5α-androstane-3,17β-diol 17-acetate having M.P. 201–203° C. (recrystallized from dichloromethane-ether) in 78% yield.

Reaction of 3α-acetoxy - 5α-androstan-17-one and diethylaluminum cyanide in the nearly same manner affords 17-cyano-5α-androstane-3α,17-diol 3-acetate having M.P. 165–167° C. (recrystallized from acetone - hexane) in 84% yield.

Reaction of 3,3;20,20-bisethylenedioxy-5α-pregnane-5-carboxyaldehyde and diethylaluminum cyanide in the nearly same manner affords 20,20-ethylenedioxy-3β-(2-hydroxyethoxy) - 3α,5 - epoxymethano - 5α-pregnane-5'-carbonitrile having M.P. 170–172° C. (recrystallized from methanol) in 83% yield.

EXAMPLE 4

A solution of 4-cholesten-3-one (2 g.) in tetrahydrofuran (60 ml.) is cooled to −60° C. To the solution there is added a solution of diethylaluminum cyanide (2.9 g.) in diisopropyl ether with stirring under argon atmosphere and then the resultant mixture is kept at −60° C. for 15 minutes. The reaction mixture is diluted with a mixture of tetrahydrofuran and concentrated hydrochloric acid (5:1) (90 ml., previously cooled to −60° C.) then with ice-water and extracted with dichloromethane. The extract is washed with water, dried and evaporated to dryness under reduced pressure to give crude product. Recrystallization of the crude product from ether affords 3-cyano-5-cholesten-3-ol (1.9 g.) having M.P. 118–121.5° C. (decomposition).

EXAMPLE 5

According to the similar treatment to the above examples, the following carbonyl compounds afford respectively the corresponding α-cyanohydrin derivative in high yield in the reaction period of approxmately 1 to 10 minutes: formaldehyde, acetaldehyde, propionaldehyde, butyraldehyde, isobutyraldehyde, valeraldehyde, crotonaldehyde, benzaldehyde, o-, m- and p-nitrobenzaldehyde, o-, m- and p-chlorobenzaldehyde, o-, m- and p-methoxybenzaldehyde, o-, m- and p-hydroxybenzaldehyde, o-, m- and p-tolualdehyde, 2-methyl - 4 - methoxybenzaldehyde, 3-methyl - 4 - methoxybenzaldehyde, piperonal, p-dimethylaminobenzaldehyde, furfural and thiophene - 2 - carboxyaldehyde.

EXAMPLE 6

According to the similar treatment to the above examples, the following carbonyl compounds afford respectively the corresponding α-cyanohydrin derivative in high yield in the reaction period of approxmately 1–10 minutes: acetone, 2 - butanone, 2 - pentanone, 2 - hexanone, 3 - methyl - 2 - butanone, 3,3-dimethyl - 2 - butanone, phenylacetone, 4 - phenyl - 2 - butanone, 5 - phenyl - 2-butanone, acetophenone, propiophenone, butyrophenone, 1 - phenyl - 1 - pentanone, 1 - phenyl - 1 - hexanone, 1-phenyl - 1 - heptanone, 1 - phenyl - 2 - methyl - 1 - propanone, 1 - phenyl - 3 - methyl - 1 - butanone, 1-phenyl-4-methyl - 1 - pentanone, 1 - phenyl - 5 - methyl - 1 - hexanone - 1 - phenyl - 2,2 - dimethyl-1-propanone and phenyl cyclohexyl ketone.

EXAMPLE 7

According to the similar treatment as above, the following carbonyl compounds afford respectively the corresponding α-cyanohydrin derivatives in good yield: cyclopentanone, cyclohexanone, 2 - methylcyclohexanone, 3-methylcyclohexanone, 4 - methylcyclohexanone, cycloheptanone, menthone, α-hydridone, camphor, fluorenone, benzophenone, anthrone and xanthone.

What is claimed is:

1. A process for the preparation of α-cyano-hydrins of the general formula

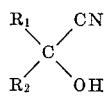

wherein $R_1$ and $R_2$ are identical or different and each represents a member selected from the group consisting of a hydrogen atom, alkyl group which may be an acylic, monocyclic or polycyclic hydrocarbon, aryl group and aralkyl group, or alternatively, $R_1$ and $R_2$ together with carbonyl group, form a cyclic ketone, which comprises reacting a compound of the general formula:

wherein $R_1$ and $R_2$ each has the same meaning as above, with an alkylcyanoaluminum compound of the general formula:

RR'AlCN wherein R and R' each represents a lower alkyl group, in an aprotic solvent at a reaction temperature not higher than room temperature within 5 hours.

2. A process for the preparation of cyanohydrins claimed in claim 1, wherein the reaction is carried out in an aprotic solvent at a reaction temperature below 0° C. within 1 hour under inert atmosphere in the presence of one or more equivalent amounts of the said alkylcyanoaluminum compound.

3. A process claimed in claim 1, wherein the aprotic solvent is selected from the group consisting of a hydrocarbon, a halogenated hydrocarbon, an acyclic or cyclic ether, and an optional combination thereof.

4. A process claimed in claim 1, wherein the aprotic solvent is selected from the group consisting of pentane, hexane, cyclohexane, benzene, toluene, chloroform, dichloromethane, dichloroethane, diethyl ether, diisopropyl ether, tetrahydrofuran, and an optional combination thereof.

5. A process claimed in claim 1, wherein the alkylcyanoaluminum compound is selected from the group consisting of dimethylaluminum cyanide, diethylaluminum cyanide, and diisobutylalumnum cyanide.

References Cited

UNITED STATES PATENTS 3,299,048 1/1967 Nagata et. al. _____ 260—239.55
3,231,566 1/1966 Nagata _____ 260—239.55

ELBERT L. ROBERTS, Primary Examiner

U.S. Cl. X.R.

260—397.2, 397.5, 397.3, 464, 465, 465.6